United States Patent
Kojima et al.

(10) Patent No.: US 8,473,556 B2
(45) Date of Patent: Jun. 25, 2013

(54) APPARATUS, A METHOD, A PROGRAM AND A SYSTEM FOR PROCESSING AN E-MAIL

(75) Inventors: Mitsuo Kojima, Tokyo (JP); Eiji Ohta, Kanagawa (JP); Hiromichi Suematsu, Tokyo (JP)

(73) Assignee: IMATRIX Corp., Kanagawa (JP)

( * ) Notice: Subject to any disclaimer, the term of this patent is extended or adjusted under 35 U.S.C. 154(b) by 247 days.

(21) Appl. No.: 12/648,884

(22) Filed: Dec. 29, 2009

(65) Prior Publication Data

US 2010/0161748 A1 Jun. 24, 2010

Related U.S. Application Data

(63) Continuation of application No. PCT/JP2007/063366, filed on Jul. 4, 2007.

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | |
|---|---|---|---|
| 6,330,590 B1 | 12/2001 | Cotten | |
| 7,636,716 B1 * | 12/2009 | Cheng | 1/1 |
| 7,664,819 B2 | 2/2010 | Murphy et al. | |
| 7,698,297 B2 * | 4/2010 | Jawa et al. | 707/713 |
| 7,945,627 B1 * | 5/2011 | Musat | 709/206 |
| 2006/0001556 A1 | 1/2006 | Lambert | |
| 2009/0070872 A1 * | 3/2009 | Cowings et al. | 726/23 |

FOREIGN PATENT DOCUMENTS

| | | |
|---|---|---|
| CA | 2 510 762 A1 | 12/2005 |
| EP | 1 613 010 A2 | 1/2006 |
| JP | 02-036460 | 2/1990 |
| JP | 2005-031926 A | 2/2005 |
| JP | 2005-227824 A | 8/2005 |
| JP | 2006-12165 A | 1/2006 |

* cited by examiner

*Primary Examiner* — Christopher Biagini
(74) *Attorney, Agent, or Firm* — Slater & Matsil, L.L.P.

(57) ABSTRACT

An e-mail processing system includes an e-mail received from an external apparatus through a network and a managing center that manages the information regarding spam mails. An e-mail system detects a spam mail from the received e-mail based on the information received from the managing center, and user PCs that receive a legitimate e-mail other than spam mails, through the e-mail system.

4 Claims, 13 Drawing Sheets

100 E-mail Processing System

FIG. 2        104 Managing Center
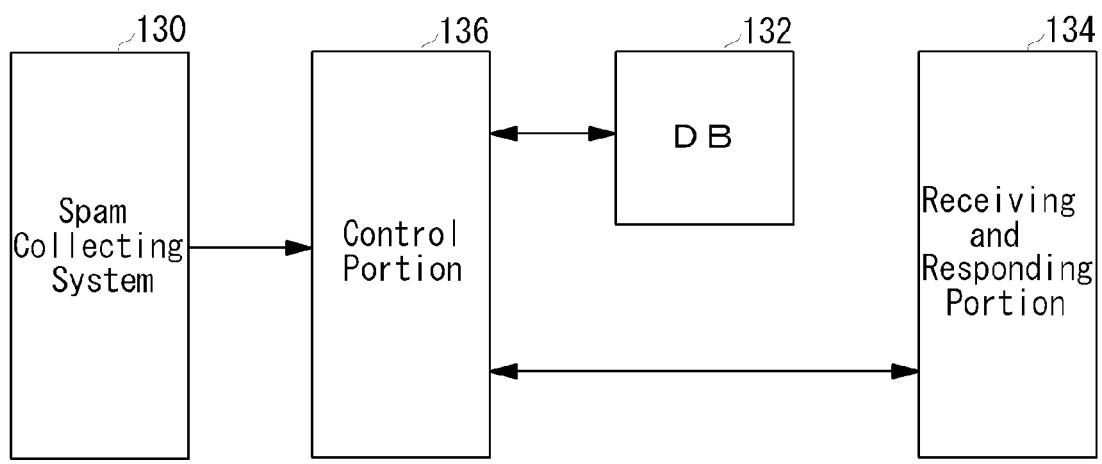
FIG. 3        136 Control Portion
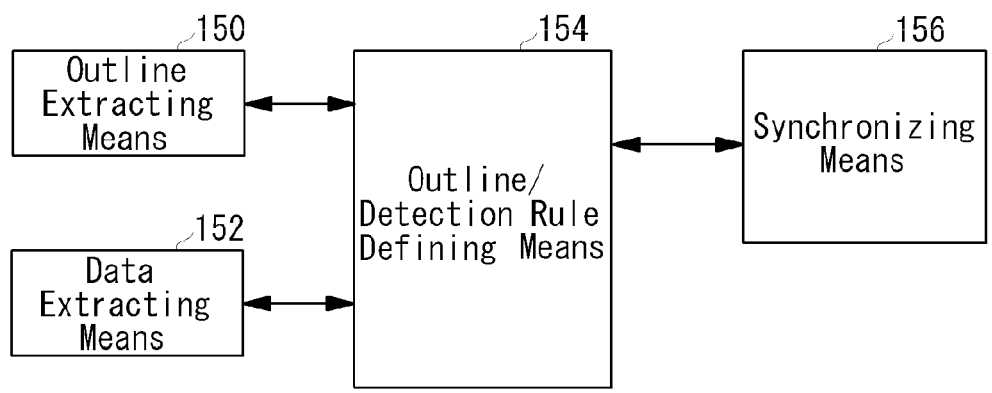

FIG. 4B

```
Received: from xxxx.xxxxx.com (Postfix)
 by (xxxxx1mbox)
 with pddf;
 Thu, xx May 200x 13:22:43 +0900 (JST)
Message-Id: <xxxxxxx@xxxxxx>
From: "xxxxxx" <xxxx@xxxx.com>
To: "xxxxxxx" <xxxx@xxxx.com>
Subject: xxxxxx
Date: Thu, xx May 200x 13:21:04 +0900
```

MIME-Version: 1.0
Content-Type: miltipart/alternative
              boundary=_NextPart_0¥000d_dhjsjie         ~168

X-Priority: 3
X-MSMail-Priority: Normal
X-Mailer: hydiaoidife 9380233
X-MimeOLE: Produced By hysidjfieV399383

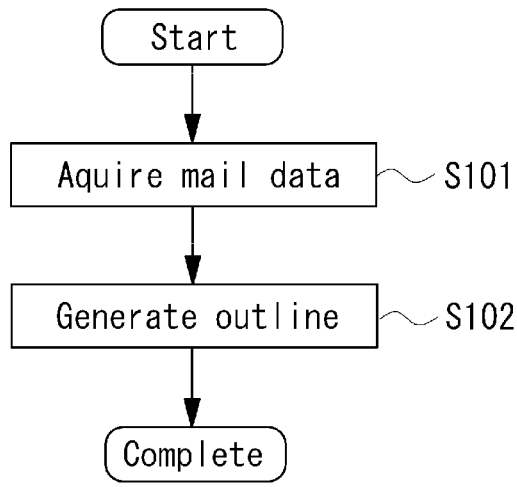

FIG. 5A

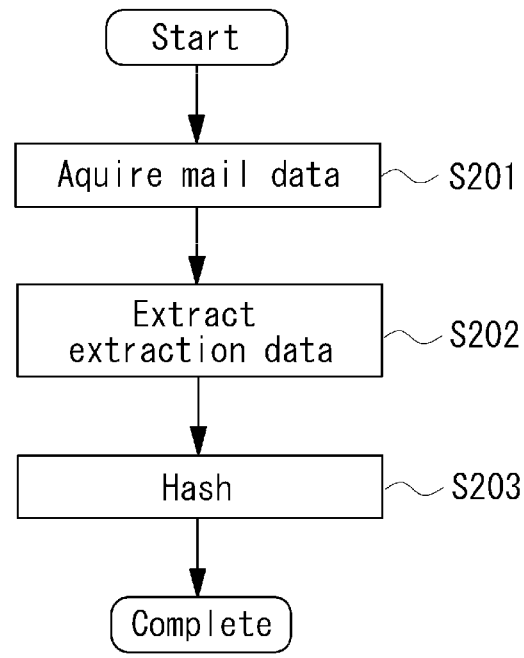

| Outline rule | Outline information | Detection rule | Extraction data |
|---|---|---|---|
| Outline rule 1 | Outline A | Detection rule 1 | Extraction data 1 |
| Outline rule 1 | Outline A | Detection rule 1 | Extraction data 2 |
| Outline rule 1 | Outline A | Detection rule 3 | Extraction data 3 |
| Outline rule 1 | Outline B | Detection rule 1 | Extraction data 4 |
| Outline rule 1 | Outline B | Detection rule 2 | Extraction data 5 |
| Outline rule 1 | Outline C | Detection rule 1 | Extraction data 6 |
| ... | ... | ... | ... |
| Outline rule n | Outline n | Detection rule n | Extraction data n |

APPARATUS, A METHOD, A PROGRAM AND A SYSTEM FOR PROCESSING AN E-MAIL

This application is a continuation of co-pending International Application No. PCT/JP2007/063366, filed Jul. 4, 2007, which designated the United States and was not published in English, which application is incorporated herein by reference in its entirety.

TECHNICAL FIELD

The present invention relates to an e-mail processing system that processes unsolicited e-mails (hereinafter called spam (junk) mails).

BACKGROUND

In recent years, e-mails have been frequently used through a communication terminal such as a computer or a mobile phone. As the use of e-mails increases, spam mails have become a concern, which are a large number of junk e-mails sent to a large number of recipients without the recipients' consent. Therefore, anti-spam systems have been used that are capable of detecting spam mails so that users can efficiently receive only the e-mails they need.

FIG. 14 illustrates a first conventional anti-spam system 10. An anti-spam system 10 includes a managing center 12 that manages the information regarding spam mails; an e-mail system 16 that detects a spam mail from a received e-mail 14 and processes it based on the information managed by the managing center 12; and user PCs 18 that receive the e-mail 14 except the spam mail, through the e-mail system 16.

The managing center 12 is coupled to the e-mail system 16 via a network or a communication line. The e-mail system 16 is capable of receiving the e-mail 14 from an external apparatus through a network. The e-mail system 16 may be, for example, an internet service provider (ISP), which offers internet services, or a network system such as a server installed in a company.

The managing center 12 manages the information regarding spam mails, for example, by creating a database 22 based on a large number of spam mails collected in a spam collecting system 20 such as a honeypot. The honeypot may collect unsolicited e-mails, i.e., spam mails by creating an e-mail address for a fictitious person, for example. The information regarding a newer spam mail is added to the database 22 each time the spam mail is found. Therefore, the volume of the information to be stored therein increases as time elapses.

A gateway 30 disposed in the e-mail system 16 downloads the database 22 from the managing center 12 at predetermined intervals. Based on the database 22, a determining portion 32 determines whether the received e-mail 14 is a spam mail. As described above, the gateway 30 is capable of detecting spam mails. Legitimate e-mails 14 other than spam mails pass through the gateway 30, and are stored in a mail server 36, and delivered to each of user PCs 18a-18c in accordance with a request from the user PCs 18.

FIG. 15 illustrates a second conventional anti-spam system 50. In a second anti-spam system 50, the determination of whether an e-mail is a spam mail can be done in a managing center 12. A mail information extracting portion 34 in a gateway 30 extracts the information regarding a received e-mail 14, and transmits the extracted information, which is called signature, to a determining portion 24 in the managing center 12. Based on the received signature and a database 22, the determining portion 24 determines whether the received e-mail 14 is a spam mail, and transmits the result of the determination to the gateway 30. Based on the received result of the determination, the gateway 30 is capable of detecting spam mails. U.S. Pat. No. 6,330,590 discloses a technique used for the second anti-spam system 50.

SUMMARY OF THE INVENTION

In the first conventional anti-spam system 10, the gateway 30 has to download the entire database 22, and thus requires a storage device having enough capacity to store the database 22. In general, the database 22 grows as time elapses. As the database 22 grows, a storage device in the gateway 30 should be added, and the cost for the addition has become a concern. The database 22 is updated at predetermined intervals. As a result, a time lag occurs, and newer spam mail cannot be detected.

In contrast, in the second conventional anti-spam system 50, the gateway 30 does not have to download the database 22, and the cost for providing a storage device can be reduced. In addition, the gateway 30 accesses the managing center 12 as the occasion arises, and thus spam mails can be detected in real time.

However, in general, a large number of gateways 30 are coupled to one managing center 12 in an anti-spam system. Therefore, if the number of the gateways 30 to be coupled to the managing center 12 increases in the second anti-spam system 50, requests for the determination of spam mails may converge on the managing center 12.

In addition, in the second anti-spam system 50, the e-mail system 16 transmits the information extracted from the e-mail 14 to the managing center 12 through a network. Therefore, if the extracted information leaks out through unauthorized access by a third party, the content of a message of the e-mail 14 may be potentially deciphered from the extracted information.

To address these problems, the present invention aims to provide an apparatus, a method, a program and a system for processing an e-mail, which are capable of determining spam mails in real time without deciphering the content of an e-mail message. Also, processes for determining spam mails can be decentralized by performing the determination of spam mails in a gateway.

An apparatus for processing an e-mail according to the present invention is capable of processing a spam mail, and may include a first outline extracting means that extracts outline information that shows a feature that appears in a received e-mail; a requesting means that requests the transmission of spam detection information from the outside for detecting a spam mail based on the outline information, a receiving means that receives the spam detection information from outside, and a first determining means that determines the e-mail is a spam mail when the content of the e-mail applies to corresponding spam detection information. The e-mail processing apparatus may correspond to a gateway that detects a spam mail from a received e-mail and processes it, and may not include a mail server.

Preferably, the e-mail processing apparatus may further include a retaining means that retains a plurality of sets of outline information and spam detection information that corresponds to the outline information; and a second determining means that determines whether the e-mail applies to corresponding spam detection information in the retaining means. The requesting means requests the transmission of spam detection information from the outside that corresponds to the outline information of the e-mail when the second determining means determines the e-mail does not apply to the spam detection information.

Preferably, the first outline extracting means extracts appearance information that excludes the body of the e-mail, the sender and the sender's e-mail address, and the receiver and the receiver's e-mail address, as the outline information. The outline information may include at least one of: the number of lines of the e-mail, an attachment file, the format of the e-mail, or the information on the language of the e-mail.

Preferably, the spam detection information includes a detection rule and extraction data detected from the e-mail using the detection rule. The first determining means determines whether the determination data detected from the received e-mail matches or is approximate to the extraction data, by using a corresponding detection rule. The term "match" as used herein does not necessarily imply 'exactly matches', but may imply 'partially matches'. The detection rule is a rule for extracting extraction data that includes at least one of: a URL, a character string in a specified area, an e-mail address, the arrangement of HTML elements, an attachment file, the result of the sorting in the body, sampling, or a character string based on a rule for detecting a spam mail. The extraction data may include at least one of: a URL, a character string in a specified area, an e-mail address, the arrangement of HTML elements, an attachment file, the result of the sorting in the body, sampling, or a character string based on a rule for detecting a spam mail.

Preferably, the e-mail processing apparatus may further include a synchronizing means for synchronizing the content of the retaining means with an external database. The synchronizing means transmits the outline information retained in the retaining means and the spam detection information that corresponds to the outline information to the external database, and makes the retaining means retain the difference of the spam detection information received through the receiving means. Alternatively, the e-mail processing apparatus may include a synchronizing means for synchronizing the content of the retaining means with an external database, and the synchronizing means transmits the outline information retained in the retaining means to the external database, receives identification information of the spam detection information that corresponds to the outline information through the receiving means, and requests the external database to transmit the spam detection information of the difference that the retaining means does not retain, based on the received identification information.

An e-mail processing system that is capable of processing spam mails according to the present invention may include the e-mail processing apparatus described above, and a managing center coupled to the e-mail processing apparatus through a network. The managing center includes a collecting means that collects spam mails; a second outline extracting means that extracts outline information that shows a feature in appearance of the collected spam mails; an extraction data extracting means that extracts extraction data for specifying a spam mail based on the detection rule; a defining means that defines extraction data for specifying a spam mail for each outline information; a database that stores the defined outline information and extraction data that corresponds to the defined outline information, as the spam detection information; and a transmitting means that transmits the information stored in the database, based on a request by the requesting means of the e-mail processing apparatus.

Preferably, the second outline extracting means extracts the outline information from a spam mail using an algorithm the same as that of the first outline extracting means. The second outline extracting means extracts appearance information that excludes the body of the spam mail, sender and the sender's e-mail address, and receiver and the receiver's e-mail address, as the outline information. The outline information may include at least one of: the number of lines of the spam mail, an attachment file, the format of the spam mail, or the information on the language of the spam mail.

Preferably, the spam detection information includes a detection rule for detecting a spam mail, and extraction data detected from the e-mail using the detection rule. The extraction data may include at least one of: a URL, a character string in a specified area, an e-mail address, the arrangement of HTML elements, an attachment file, the result of the sorting in the body, sampling, or a character string based on a rule for detecting a spam mail. The detection rule is a rule for extracting the extraction data that includes at least one of: a URL, a character string in a specified area, an e-mail address, the arrangement of HTML elements, an attachment file, the result of the sorting in the body, sampling, or a character string based on a rule for detecting a spam mail. Preferably, the transmitting means transmits the spam detection information to the e-mail processing apparatus in response to the synchronizing means of the e-mail processing apparatus.

A method/program for processing an e-mail according to the present invention includes a step of extracting outline information that shows a feature that appears in a received e-mail, a step of searching for spam detection information for detecting a spam mail from a memory based on the extracted outline information, a first determination step of determining whether the e-mail applies to a spam mail based on the searched spam detection information, a step of requesting an external database to transmit spam detection information that corresponds to the outline information when it is determined that the e-mail does not apply to a spam mail, and a second determination step of determining whether the e-mail applies to a spam mail based on the spam detection information received from the external database.

Preferably, the spam detection information includes a detection rule and extraction data detected from an e-mail using the detection rule. The first determination step determines whether the determination data detected from the received e-mail by using a corresponding detection rule matches the extraction data. The method for processing an e-mail may further include a step of storing the spam detection information received from the external database into the memory and synchronizing the external database with the memory.

An apparatus, a method, a program and a system for processing an e-mail according to the present invention are capable of performing the determination of spam mails in real time. The processes for determining spam mails are performed in the e-mail processing apparatus, and thus the processes for determining spam mails do not converge on the managing center, and the determination processes can be decentralized. In addition, the content of the e-mail message will not leak out even if the outline information leaks out.

BRIEF DESCRIPTION OF THE DRAWINGS

FIG. 2 is a block diagram illustrating an example of a configuration of a managing center;

FIG. 3 is a block diagram illustrating an example of a functional configuration of a managing center according to an embodiment;

FIG. 4B illustrates an example of source code of a header portion;

FIG. 5A is a flowchart illustrating an operation for generating an outline;

FIG. 5B is a flowchart illustrating an operation for extracting extraction data;

FIG. 7 illustrates a data structure of a database;

Figure 1A:
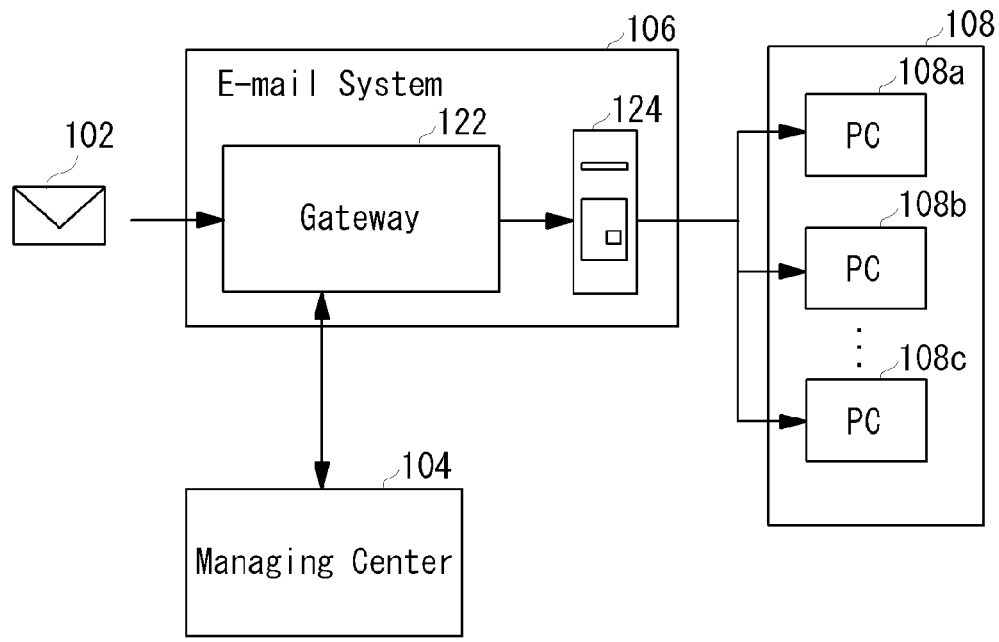
FIG. 1A is a block diagram illustrating an example of a configuration of an e-mail processing system according to an embodiment.

The following list of reference symbols may be used in conjunction with the drawings:

100: e-mail processing system
102: e-mail
104: managing center
106: e-mail system
108: user PC
122: gateway
124: mail server
130: spam collecting system
132: database
134: receiving and responding portion
136: control portion
150: outline extracting portion
152: data extracting means
154: outline/detection rule defining means
156: synchronizing means
170: e-mail obtaining portion
172: local cache
174: requesting and responding portion
176: e-mail transmitting means
178: control portion
180: outline extracting means
182: requesting means
184: synchronizing means
186: detection rule managing means
188: spam determining means

DETAILED DESCRIPTION OF ILLUSTRATIVE EMBODIMENTS

Referring to the drawings, embodiments for implementing the present invention will be described.

FIG. 1A illustrates an example of a configuration of an e-mail processing system according to an embodiment. An e-mail processing system 100 may include an e-mail 102 received from an external apparatus through a network; a managing center 104 that manages the information regarding spam mails; an e-mail system 106 that detects and processes a spam mail contained in the e-mail 102, based on the information received from the managing center 104; and user PCs 108 that receive the e-mail 102 other than the spam mail, through the e-mail system 106.

The e-mail system 106 may include a gateway 122 that detects a spam mail from the received e-mail 102 and processes it, and a mail server 124 that stores the e-mail 102 passed through the gateway 122. The mail server 124 is capable of delivering the stored e-mail 102 to each of user PCs 108a-108c in accordance with a request from the user PCs 108. The gateway 122 may perform various processings such as blocking a detected spam mail by deleting/collecting it, or transmitting it to the mail server 124 after adding an identification tag.

Figure 1B:
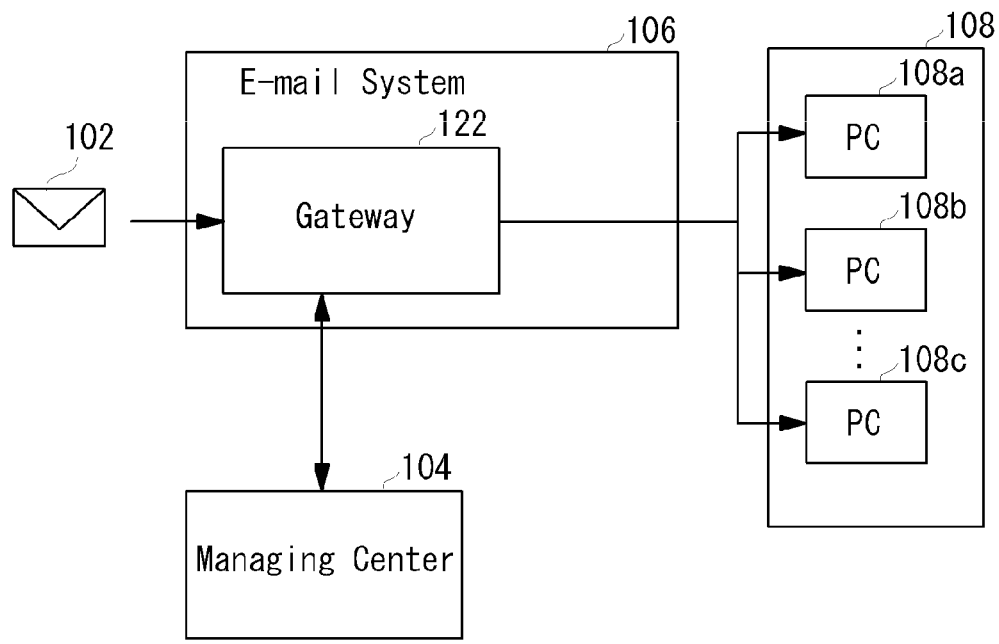
FIG. 1B is a block diagram illustrating an example of another configuration of an e-mail processing system.

FIG. 1B illustrates an example of another configuration of an e-mail processing system. An e-mail system 106 includes at least a gateway 122 that detects a spam mail from a received e-mail 102 and processes it. In this case, the gateway 122 has a mail server function.

FIG. 2 illustrates an example of a configuration of a managing center according to an embodiment. The managing center includes a spam collecting system 130 that collects a large number of spam mails, a database 132 that stores the information regarding the spam mails collected in the spam collecting system 130, a receiving and responding portion 134 that transmits the information regarding the spam mails in response to a request from a gateway 122, and a control portion 136 that controls each of these components.

FIG. 3 is a block diagram illustrating a functional configuration of the control portion 136. The control portion 136 includes an outline extracting means 150 that extracts outline information from the spam mails collected in the spam collecting system 130; a data extracting means 152 that extracts data from the spam mails based on a detection rule that corresponds to the extracted outline information; an outline/detection rule defining means 154 that defines an outline rule for extracting outline information from the spam mails and a detection rule for extracting data from the spam mails, and stores spam detection information that includes a combination of the detection rule and the data extracted from the spam mails (hereinafter called extraction data) into the database 132 and associating them with the outline information; and a synchronizing means 156 that receives the outline information or other information transmitted from the gateway 122, and transmits the information stored in the database 132 to the gateway 122.

The outline information is extracted based on the outline rule. The outline information is the information that represents an attribute of the e-mail and shows a feature in appearance. The information may be appearance information regarding the number of the lines of the e-mail, the number of characters, or the presence or absence of an attachment file, for example. As described above, the outline information is not the information that shows the content of the e-mail message. Therefore, even if a third party obtains the outline information on a network, the information regarding the content of the e-mail message does not leak out. The outline rule described above is a rule for extracting outline information from spam mails, and may be previously defined by an administrator or other authorized person.

Figure 4A:
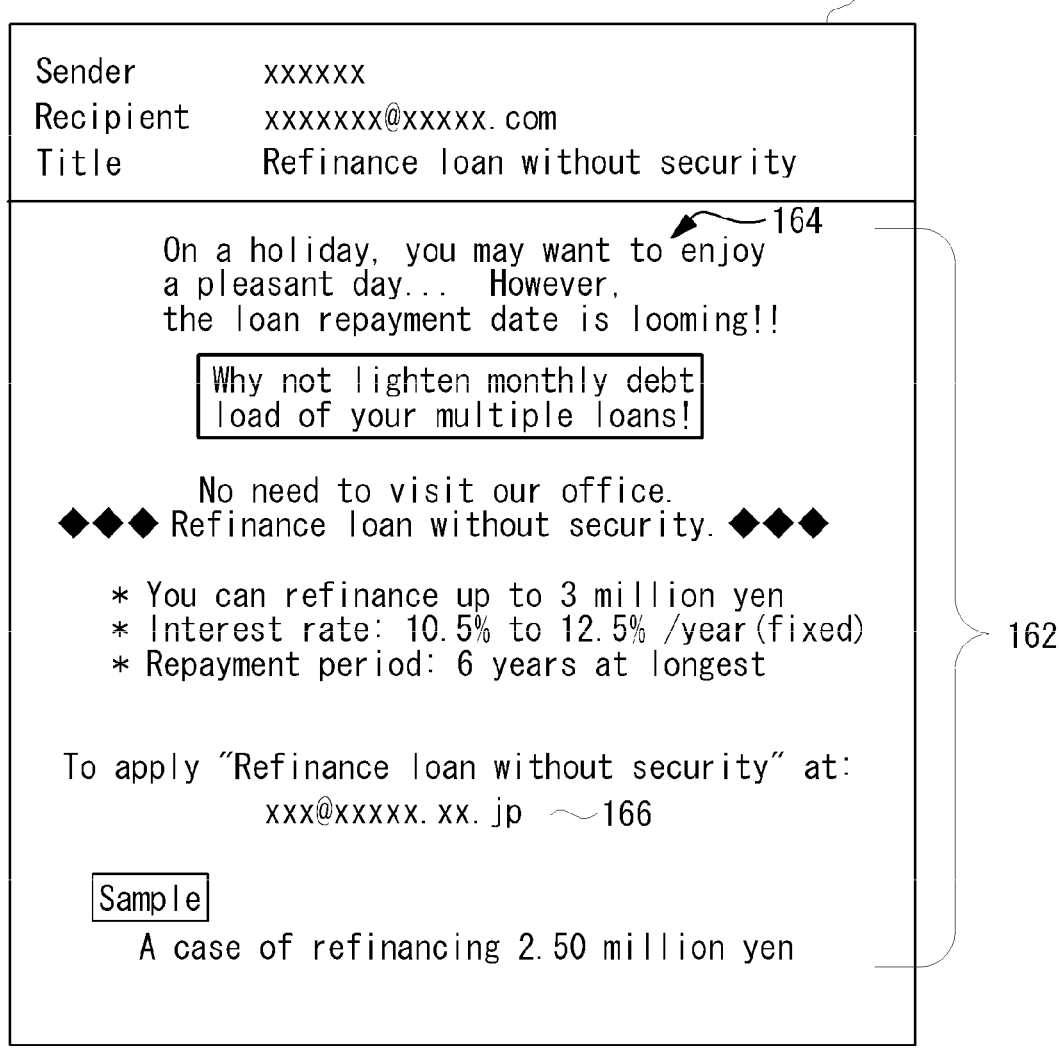
FIG. 4A illustrates an example how a spam mail is displayed.

FIG. 4A illustrates an example how a spam mail is displayed. In general, a display indication of an e-mail (which may include a spam mail) to be displayed to a user is created based on mail data made up of a header portion and a body portion. The outline extracting means 150 does not extract the content or expression of the e-mail body. The outline extracting means 150 analyzes the mail data of a spam mail 160 and extracts, for example, the number of the lines 162 of an e-mail, language (English) 164, or an e-mail address 166 described in a specified area, as the outline information. In addition, the outline extracting means 150 may extract MIME (Multipurpose Internet Mail Extension), which defines a method for indicating the type of the spam mail 160, from a data portion 168 of the mail data (header portion) as shown in FIG. 4B, as the outline information.

It should be noted that the outline extracting means 150 excludes the sender and the sender's e-mail address, and the receiver and the receiver's e-mail address from the object to be extracted as the outline information. This is because identities can be specified from these kinds of information. In addition, it is desirable that the title of the e-mail be excluded from the object to be extracted.

The detection rule is provided for determining a rule for detecting extraction data from a spam mail, and is defined corresponding to the outline information of the spam mail. A default rule may be previously defined for the detection rule; however, the outline/detection rule defining means 154 may add or change the detection rule so that the rule can detect a newer spam mail.

The detection rule may be, for example, a URL, an image, a special character, or a phrase contained in a spam mail, or other information about a predefined rule, and may include a program for extracting these kinds of information. For example, if the detection rule is a URL, the data extracting means 152 extracts actual data of a URL beginning with "http" contained in a spam mail, based on the detection rule. If the detection rule is a special character, the data extracting means 152 extracts from a spam mail actual data that does not apply to any of the 50-character Japanese syllabary or alphabet. If the detection rule is a phrase, the data extracting means 152 extracts a phrase contained in a spam mail based on the detection rule. The term "phrase" may be defined as three or more continuous Chinese characters, for example.

The outline extracting means 150 and the data extracting means 152 each extracts the outline information or the extraction data from the mail data of a spam mail based on a predefined rule. An administrator or other authorized person may change or add the definition of the outline rule or the detection rule, as changes of spam mails have become increasingly sophisticated.

Referring to a flowchart of FIG. 5A, an operation for generating outline information by an outline extracting means will be described. The outline extracting means 150 acquires mail data from the spam mails collected in the spam collecting system 130 (step S101). The outline extracting means 150 generates outline information based on the acquired mail data (step S102). The outline extracting means 150 may extract a plurality of pieces of outline information from one spam mail.

The outline information is the data that represents an attribute of the e-mail, and does not show the content of the e-mail message. The outline information may be a data array that is a combination of: the number of lines and width of the e-mail, the presence or type of MIME that defines a method for indicating the type of the mail data, the format, language or other information regarding the mail data, for example. The outline extracting means 150 generates the outline information in order to classify a variety of spam mails.

Referring to a flowchart of FIG. 5B, an operation for extracting extraction data by a data extracting means will be described. The outline extracting means 150 acquires mail data from the spam mails collected in the spam collecting system 130 (step S201). The data extracting means 152 extracts extraction data for specifying a spam mail from one mail data, based on a predefined detection rule (step S202). As has been described, the detection rule is a rule for detecting a URL or e-mail address contained in the mail data, a character string in a specified area, the arrangement of HTML elements, the result of the sorting in the body, sampling, or a character string based on a rule, for example.

Examples of the character string in a specified area include a heart or other symbol contained in a specified area in the body of the mail data. Examples of the arrangement of HTML elements include an image tag (img) or the like in the mail data. Examples of the result of the sorting in the body include a phone number (in the case beginning with "TEL") or other data that appears first in the result of the sorting. Examples of the sampling include a case where the first character in the fifth line and the first character in the tenth line are fixed. Examples of the character string based on a rule include the number or appearance of the letter "A".

The spam detection information that is a combination of a detection rule and extraction data is transmitted to the gateway 122 through a network in response to a request of the gateway 122. Therefore, the data extracting means 152 may hash the extraction data in order to reduce the amount of data communication (step S203).

Figure 6:
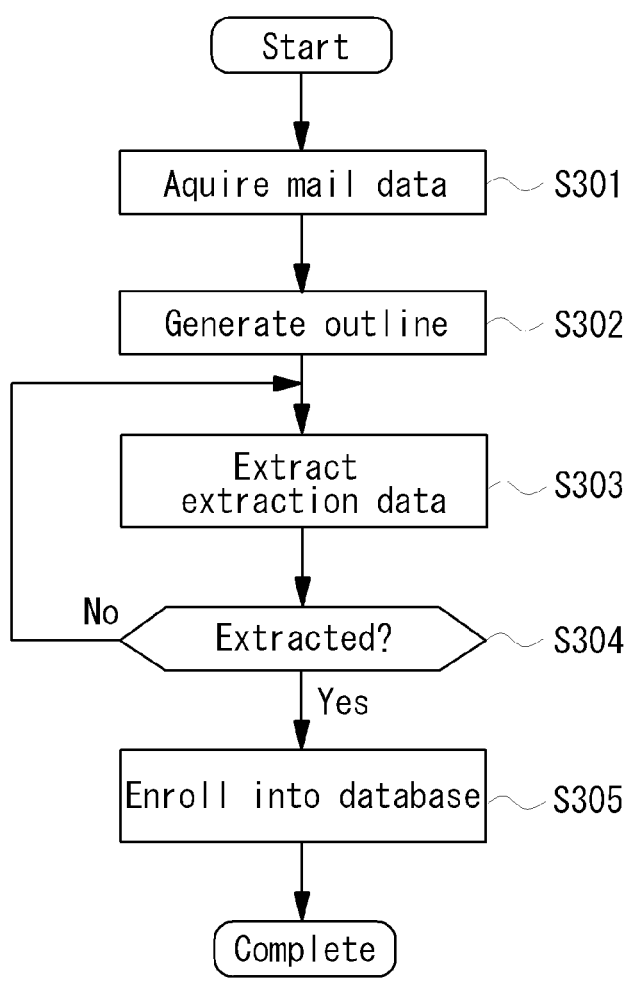
FIG. 6 is a flowchart illustrating an operation for configuring a database.

Referring to a flowchart of FIG. 6, an operation for configuring a database by an outline/detection rule defining means will be described. The outline extracting means 150 acquires mail data from a spam mail M collected in the spam collecting system 130 (step S301), and generates outline information, based on the defined outline rule (step S302). After the outline information is generated, the data extracting means 152 extracts extraction data from the mail data, based on a predefined detection rule (step S303). The outline/detection rule defining means 154 determines whether the extraction data is extracted (step S304), and enrolls the outline rule, the outline information, the detection rule corresponding to the outline information, and the extraction data into the database 132 when the extraction data is extracted (step S305). When the extraction data is not extracted, the process returns to the step S303, and the data extracting means 152 extracts extraction data by another detection rule.

FIG. 7 illustrates a data structure of a database. The database 132 stores the outline rule, the outline information, the detection rule, and the extraction data that are enrolled by the outline/detection rule defining means 154. For example, to specify a spam mail M, "outline rule 1", "outline A", "detection rule 1", and "extraction data 1" are enrolled. Of course, a plurality of outline rules may be enrolled to specify one spam mail M, and a plurality of pieces of outline information may be generated for one outline rule. In addition, a plurality of detection rules may be defined for one outline information.

Figure 8:
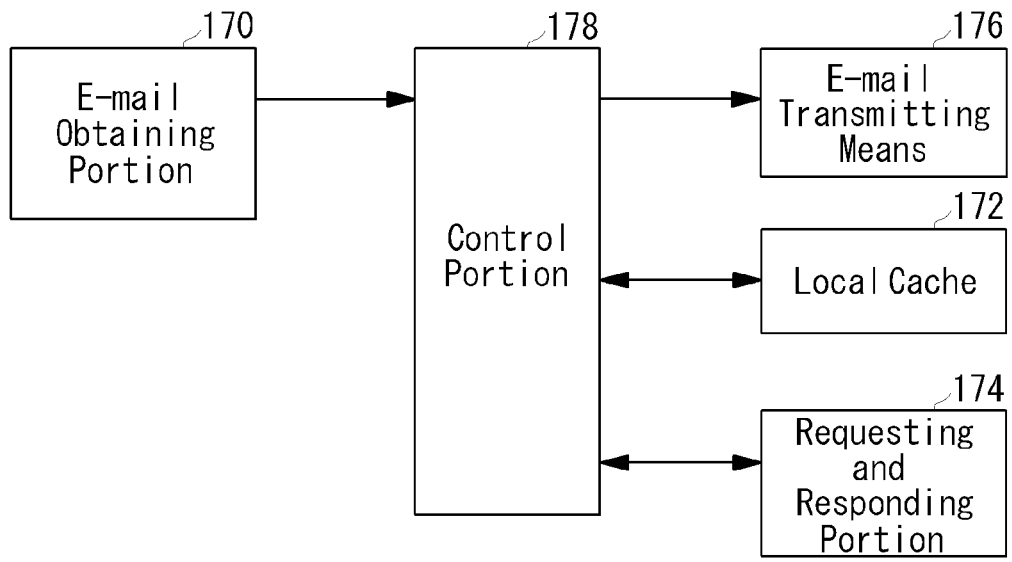
FIG. 8 is a block diagram illustrating an example of a configuration of a gateway.

FIG. 8 illustrates an example of a configuration of a gateway according to an embodiment. The gateway 122 includes an e-mail obtaining portion 170 that obtains an e-mail 102 from an external apparatus through a network, a local cache 172 that stores a detection rule for detecting a spam mail and extraction data, a requesting and responding portion 174 that requests spam detection information for determining whether the e-mail 102 is a spam mail based on the outline information of the e-mail, an e-mail transmitting means 176 that transmits the e-mail 102 to a mail server 124 when the e-mail 102 is not a spam mail, and a control portion 178 that controls each of the components described above.

The local cache 172 stores the detection rule that is once transmitted from the managing center 104 and used for detecting spam mails, and extraction data that corresponds to the detection rule, for a predetermined time period. Based on the detection rule and the extraction data stored in the local cache 172, the control portion 178 can detect a spam mail when the e-mail 102 is approximate to a spam mail once detected. In addition, even when the e-mail 102 is a spam mail, the e-mail transmitting means 176 may transmit it to the mail server 124 after adding an identification tag.

Figure 9:
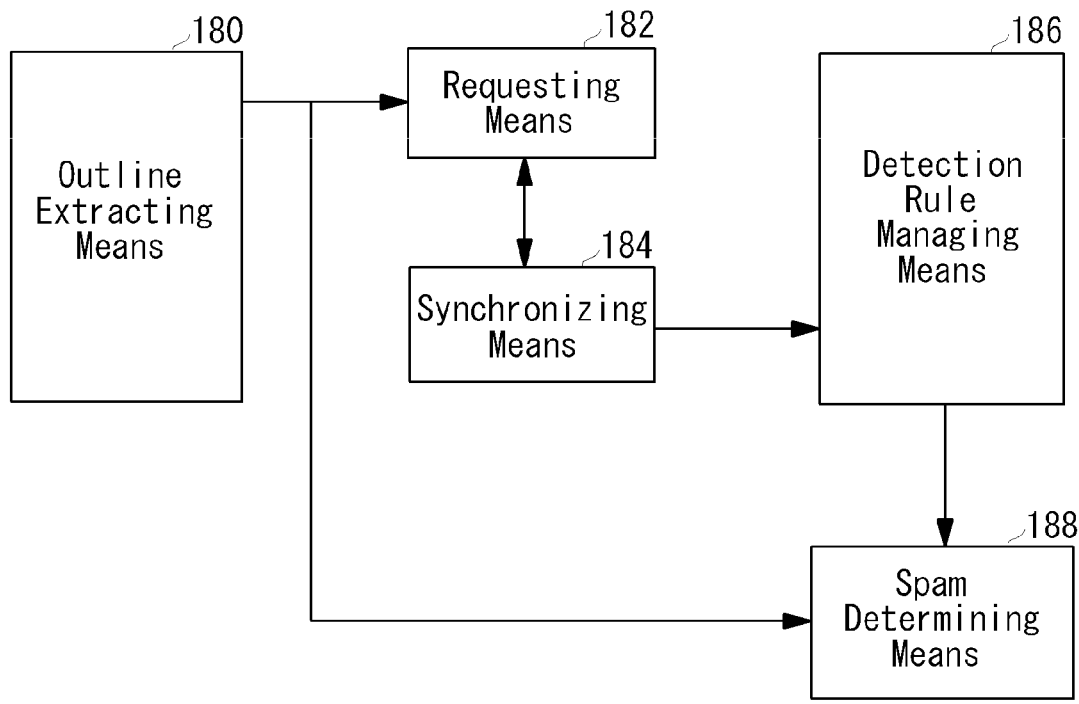
FIG. 9 is a block diagram illustrating an example of a functional configuration of a gateway according to an embodiment.

FIG. 9 is a block diagram illustrating a functional configuration of the control portion 178. The control portion 178 includes an outline extracting means 180 that extracts outline information based on the e-mail 102 obtained by the e-mail obtaining portion 170; a requesting means 182 that requests a spam list or other list, which contains spam detection information, to the managing center 104 based on the extracted outline information; a synchronizing means 184 that obtains a detection rule and extraction data from the managing center 104 based on the spam list obtained from the managing center 104 according to the requesting means 182; a detection rule managing means 186 that manages the detection rule and the extraction data obtained from the synchronizing means 184; and a spam determining means 188 that extracts determination data from the e-mail 102 based on the detection rule that corresponds to the outline information, compares the determination data with the extraction data that is managed by the local cache 172 or the detection rule managing means 186, and determines whether the obtained e-mail 102 is a spam mail. Described on the spam list are the detection rule and extraction data that correspond to the outline information of the e-mail 102 and required for determining whether the e-mail 102 is a spam mail.

The outline extracting means 180 extracts the outline information from the e-mail 102 based on an algorithm the same as that of the outline extracting means 150 in the managing center 104. The synchronizing means 184 compares the detection rule retained in the managing center 104 with the detection rule is retained in the local cache 172, based on a spam list or other list, and synchronizes them to obtain a detection rule and extraction data. As described above, the gateway 122 can obtain from the managing center 104 only the extraction data required for determining whether the e-mail 102 is a spam mail. In addition, the synchronizing means 184 can obtain the outline rule defined in the managing center 104, and thus the gateway 122 retains the latest outline rule.

The spam determining means 188 is capable of extracting determination data from the e-mail 102, based on the detection rule that corresponds to the outline information. The determination data is extracted from the e-mail 102 based on an algorithm the same as that of the extraction data, and thus the format of these data are same. Therefore, the spam determining means 188 can compare the extraction data and the determination data, and determine that the e-mail 102 is a spam mail when these data match or are approximate to each other.

The term "match" as used herein does not necessarily imply 'exactly match' but may imply 'partially match' or 'are approximate to.' If the detection rule is regarding a URL, and the extraction data is "http://ooo.com" and the determination data is "http://ooox.com", these data partially match each other, and the spam determining means 188 determines the e-mail is spam mail. If the detection rule counts the number of a specified character, and the extraction data is "4" and the determination data is "5", the value of the determination data of "5" includes the value of the extraction data of "4." The spam determining means 188 regards it as a partial match, and determines the e-mail is spam mail.

The requesting means 182 transmits the outline information to the managing center 104. At this time, a third party may potentially obtain the outline information on a network through unauthorized access, and decipher the outline information. However, the outline information is the appearance information of the e-mail, and thus the information regarding the content of the message will not leak out even if the third party deciphers the outline information.

Figure 10:
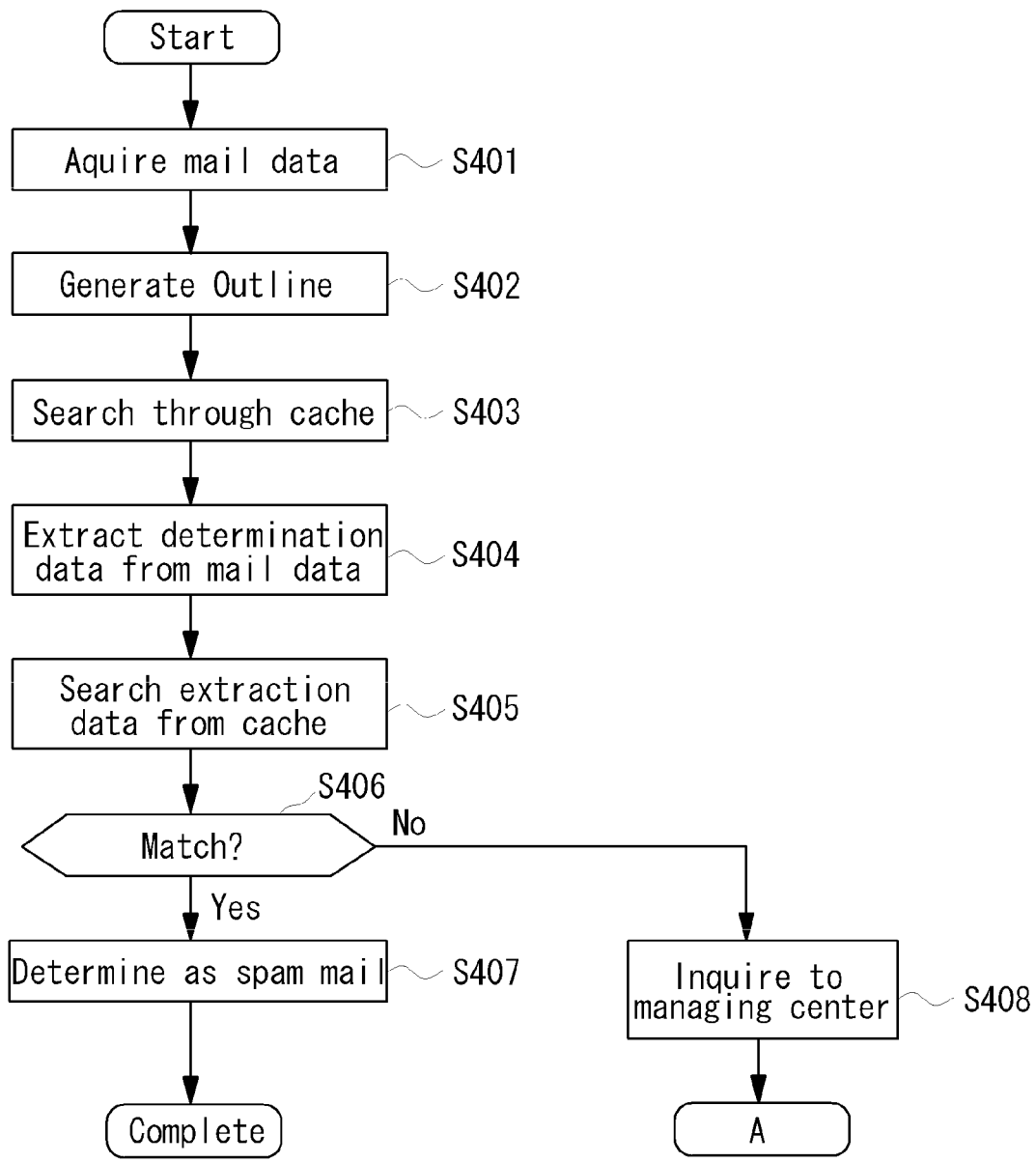
FIG. 10 is a flowchart illustrating an operation for determining spam by an e-mail processing system according to an embodiment.

Referring to a flowchart of FIG. 10, an operation for determining spam by a gateway will be described. The outline extracting means 180 acquires mail data of the e-mail 102 obtained by the e-mail obtaining portion 170 (step S401), and generates outline information (step S402). The spam determining means 188 searches through the local cache 172 based on the generated outline information (step S403), and extracts determination data from the mail data, based on the detection rule stored in the local cache 172 (step S404).

The spam determining means 188 searches for extraction data in the local cache 172 (step S405), and determines whether the determination data matches the extraction data (step S406). If these data match each other, the spam determining means 188 determines the e-mail 102 is a spam mail (step S407).

If the determination data does not match the extraction data, the gateway 122 makes an inquiry to the managing center 104 in order to obtain a detection rule and extraction data for determining whether the e-mail 102 is a spam mail (step S408).

Figure 11:
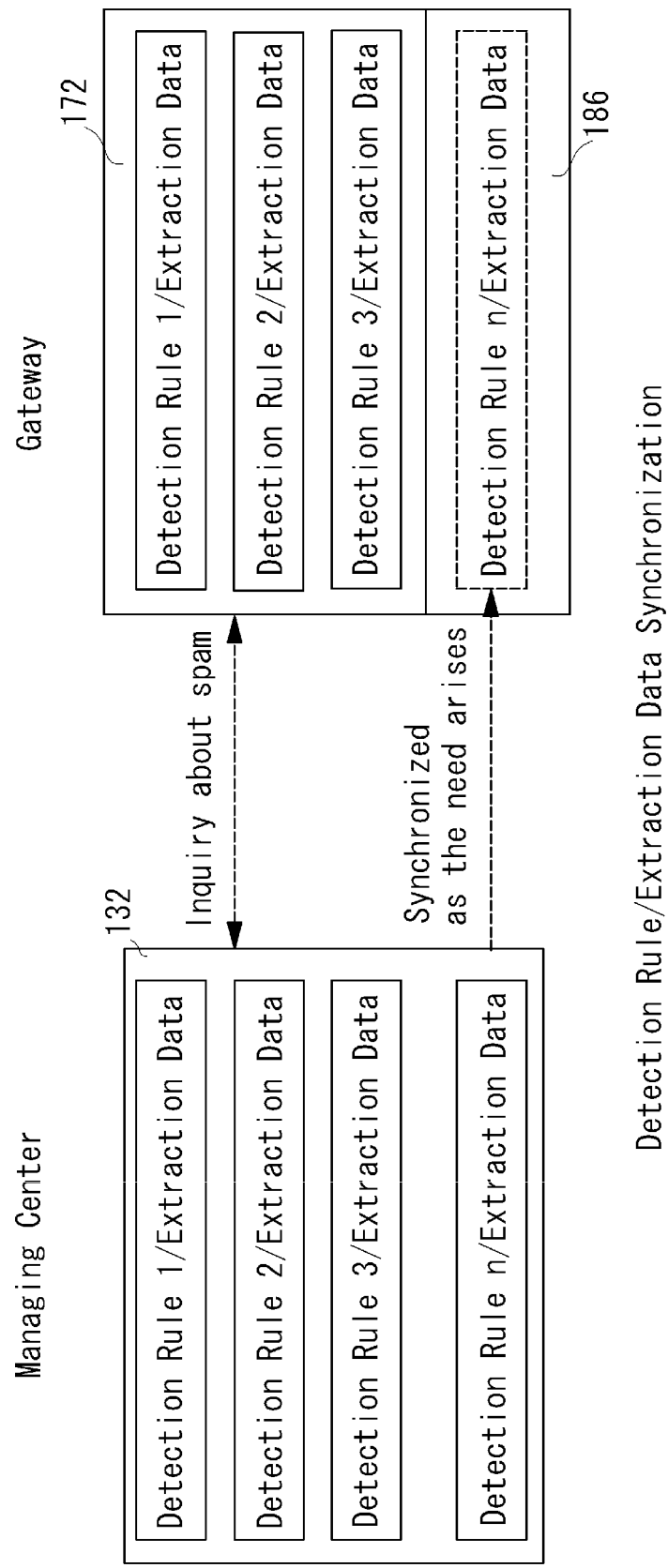
FIG. 11 illustrates the concept of the synchronization for obtaining a detection rule and extraction data.

FIG. 11 illustrates the concept of the synchronization for obtaining a detection rule and extraction data. The synchronizing means 156 in the managing center 104 and the synchronizing means 184 in the gateway 122 compare detection rule/extraction data retained in the database 132 with detection rule/extraction data retained in the local cache 172, each corresponding to certain outline information. Based on the difference therebetween, only the detection rule that is not retained in the local cache 172 and corresponding extraction data can be efficiently obtained. The obtained detection rule/extraction data are managed by the detection rule managing means 186.

For example, the database 132 that corresponds to certain outline information retains "detection rule 1/extraction data", "detection rule 2/extraction data", "detection rule 3/extraction data" and "detection rule n/extraction data". If the local cache 172 already retains these pieces of detection rule/extraction data other than the "detection rule n/extraction data", the synchronizing means 184 obtains only the "detection rule n/extraction data" from the database 132. As described above, the gateway 122 may obtain a detection rule for detecting a spam mail and corresponding extraction data from the managing center 104.

Figure 12:
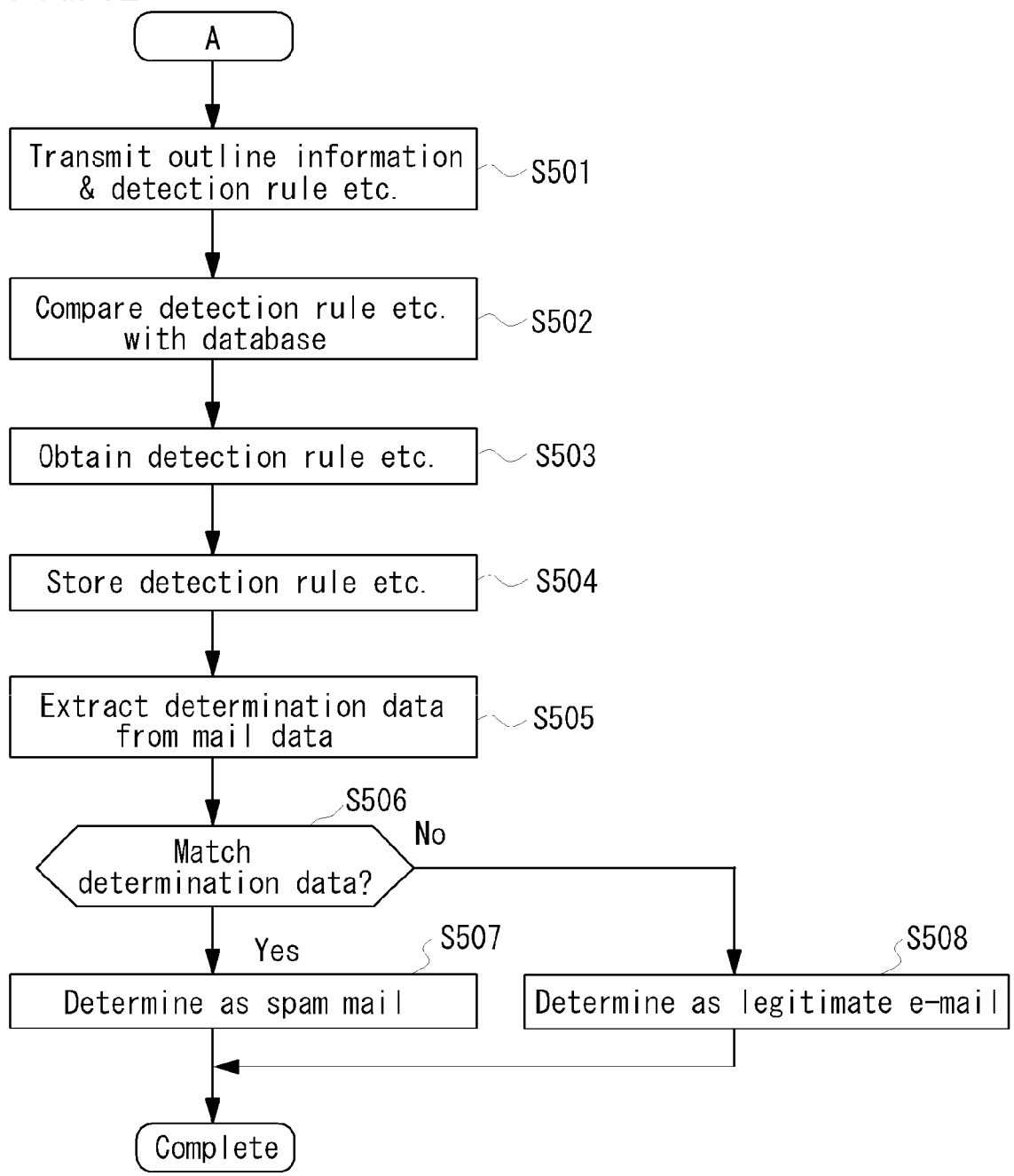
FIG. 12 is a flowchart illustrating an operation for determining spam, including a first synchronization of a gateway by a managing center inquiry.

Referring to a flowchart of FIG. 12, an operation for determining spam, including a first synchronization of a gateway by a managing center inquiry, will be described. The requesting means 182 transmits the generated outline information, a detection rule corresponding to the outline information and retained in the local cache 172, and corresponding extraction data to the managing center 104 (step S501). After the outline information, the detection rule, and the extraction data are obtained, the managing center 104 compares the detection rule/extraction data that corresponds to the obtained outline information with the information retained in database 132 (step S502). The synchronizing means 156 synchronizes them based on the difference in the comparison. As described above, the gateway 122 obtains the detection rule and the extraction data required for spam determination from the managing center 104 (step S503), and stores the detection rule and the extraction data obtained by the detection rule managing means 186 (step S504).

The spam determining means 188 extracts determination data from the e-mail data of the e-mail 102 based on the stored detection rule (step S505). After the determination data is extracted, the spam determining means 188 determines whether the extraction data stored in the detection rule managing means 186 matches the determination data of the e-mail 102 (step S506). The spam determining means 188 determines the e-mail 102 is a spam mail when the extraction data matches the determination data (step S507). When it does not match the determination data, the e-mail 102 is regarded as a legitimate e-mail (step S508), and transmitted to the mail server 124 by the e-mail transmitting means 176. The determination operation may be iterated in accordance with a predetermined number of times or time period when the determination data does not match the extraction data in the step S506. Finally, the detection rule and the extraction data used for spam determination are stored in the local cache 172, and retained for a predetermined time period.

Figure 13:
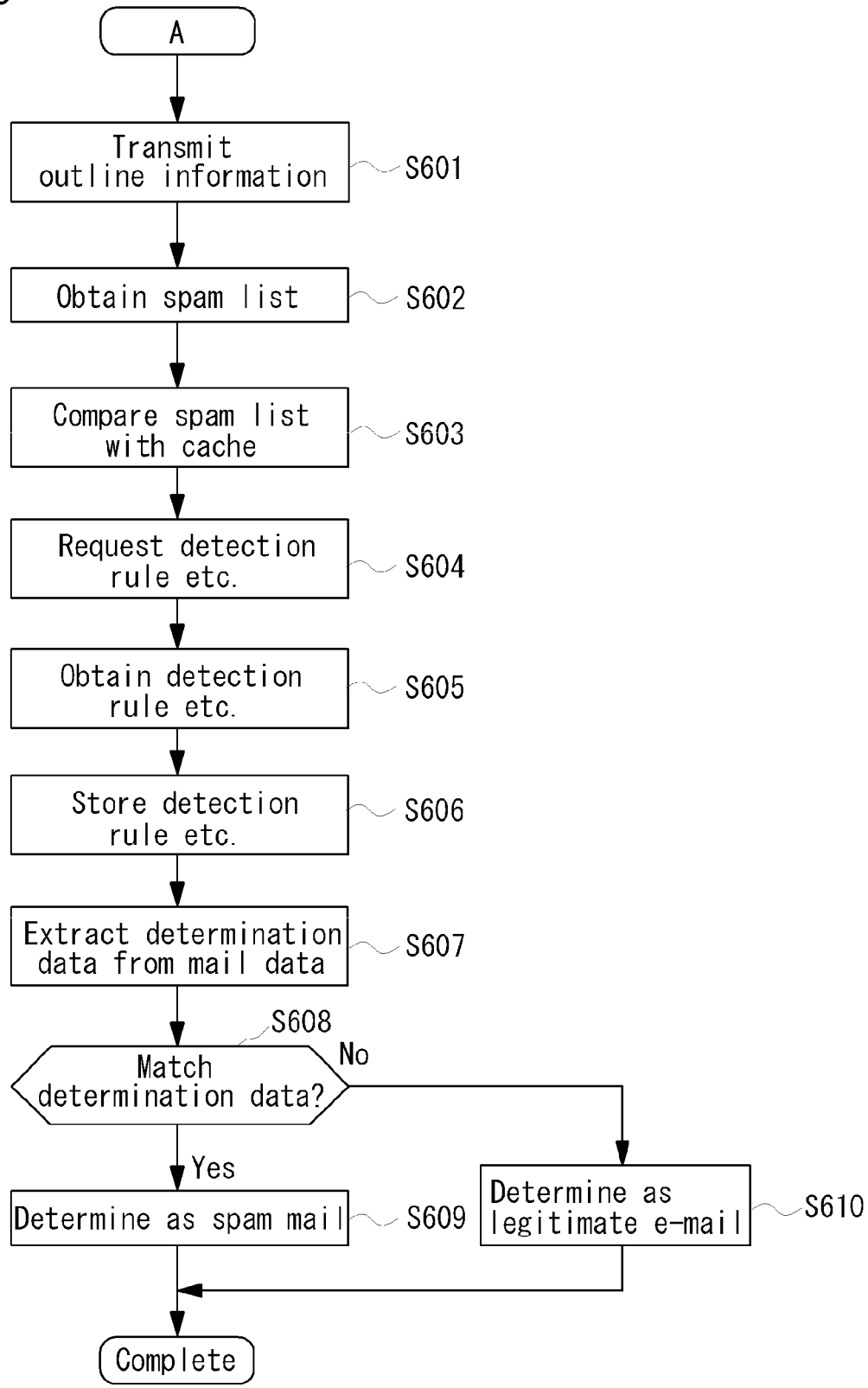
FIG. 13 is a flowchart illustrating an operation for determining spam, including a second synchronization of a gateway by a managing center inquiry.
Figure 14:
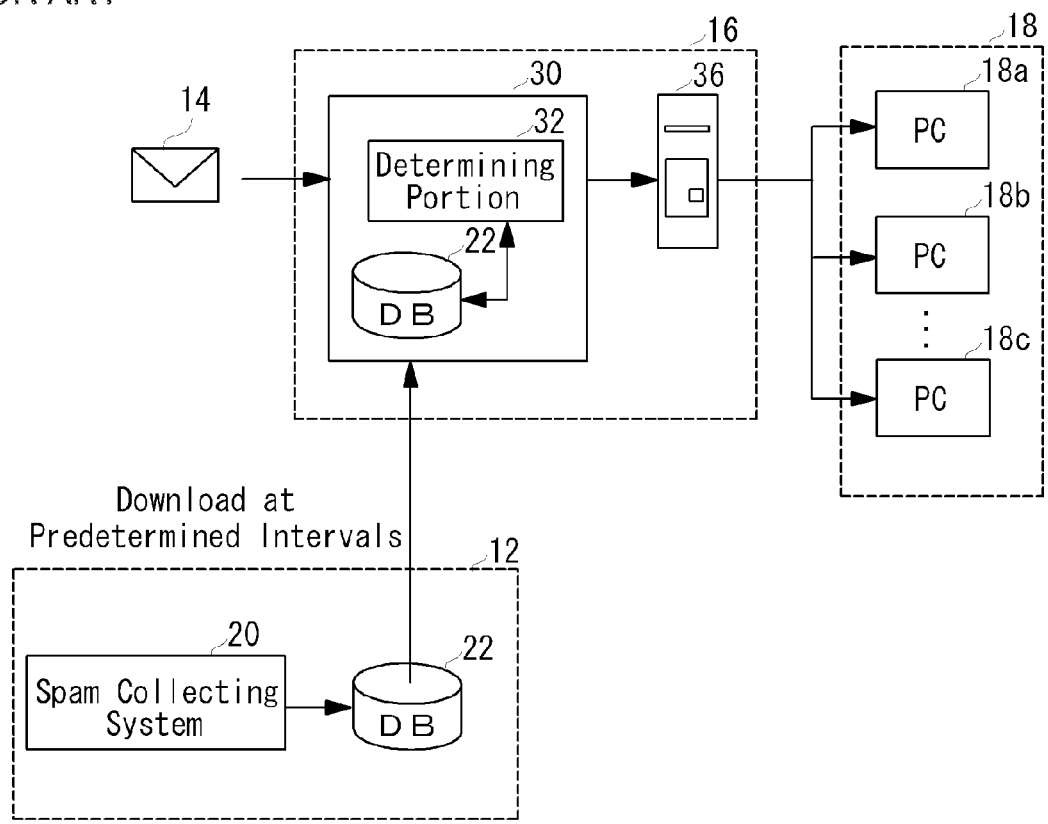
FIG. 14 illustrates an example of a configuration of a first anti-spam system.
Figure 15:
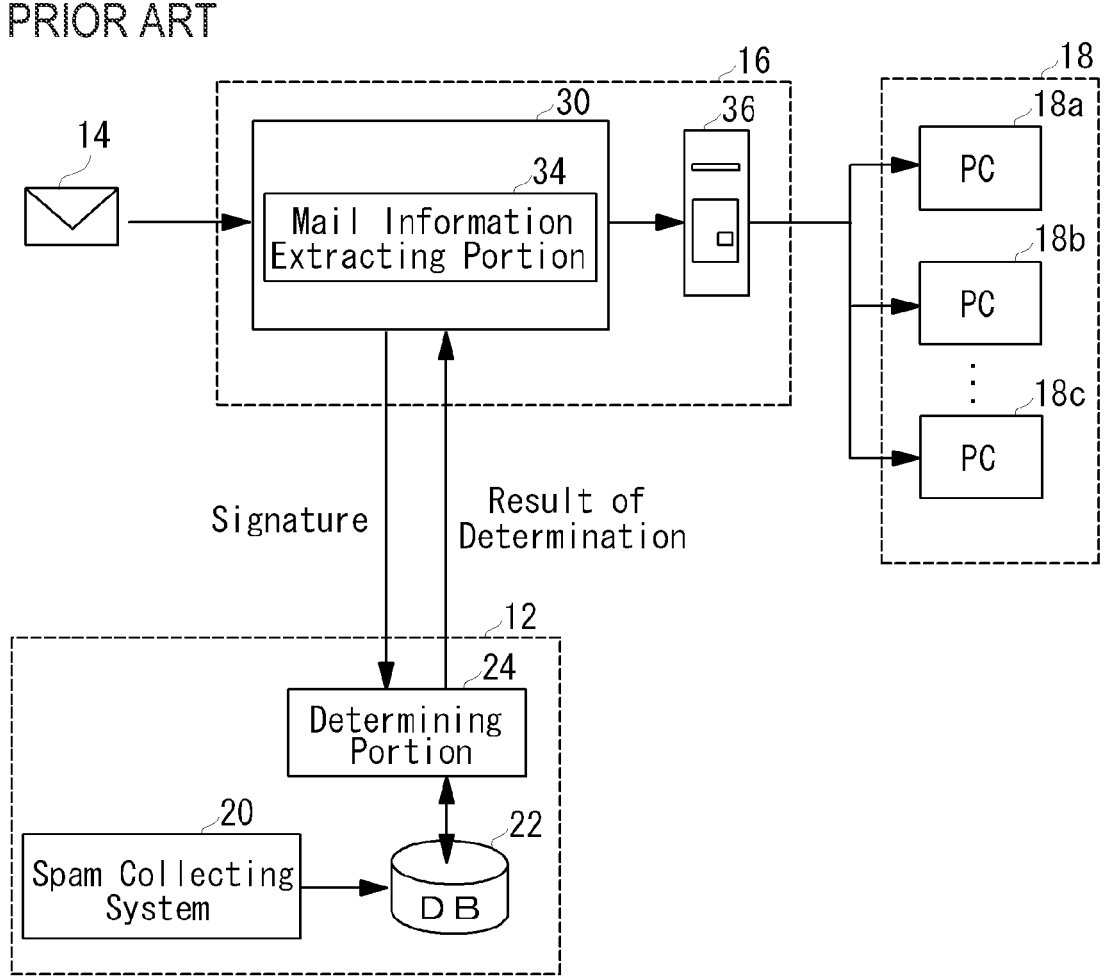
FIG. 15 illustrates an example of a configuration of a second anti-spam system.

Referring to a flowchart of FIG. 13, a spam determination operation including a second synchronization of a gateway by a managing center inquiry will be described. The requesting means 182 transmits the generated outline information (step S601). Based on the outline information, the requesting means 182 requests from the managing center 104 a spam list. The spam list includes detection information on which corresponding detection rules are described.

The gateway 122 obtains the spam list from the managing center 104 (step S602), and compares the detection rules described in the spam list with the detection rules retained in the local cache 172 (step S603). From the difference therebetween, the synchronizing means 184 specifies a detection rule that is not retained in the local cache 172 and required for spam determination, and corresponding extraction data; and requests them to the managing center 104 (step S604).

As described above, the gateway 122 obtains the detection rule and extraction data required for spam determination from the managing center 104 (step S605). The detection rule managing means 186 stores the obtained detection rule and extraction data (step S606).

Based on the stored detection rule, the spam determining means 188 extracts determination data from the mail data of the e-mail 102 (step S607). After the determination data is extracted, the spam determining means 188 determines whether the extraction data stored in the detection rule managing means 186 matches the determination data of the e-mail 102 (step S608). When the extraction data matches the determination data, the spam determining means 188 determines the e-mail 102 is a spam mail (step S609). When it does not match the determination data, the e-mail 102 is regarded as a legitimate e-mail (step S610), and transmitted to the mail server 124 by the e-mail transmitting means 176. When determined that the determination data does not match the extraction data, in the step S608, the determination operation may be iterated in accordance with a predetermined number of times or time period, similarly to the first spam determination operation. Finally, the detection rule and the extraction data used for spam determination are stored in the local cache 172, and retained for a predetermined time period.

In the examples described above, the managing center and the gateway manage the detection rules for detecting a spam mail and its corresponding extraction data; however, the invention is not necessarily limited to these examples. They may manage the detection rules for detecting a legitimate e-mail other than spam mails and corresponding extraction data.

According to the examples described above, spam mails can be determined in real time. The spam mail determination process is performed in the gateway, and thus processes for determining spam mails do not converge on the managing center, and the determination processes can be decentralized. Furthermore, the content of the e-mail message will not leak out even if the outline information leaks out.

The foregoing description of the examples has been provided for the purposes of illustration and description, and it is not intended to limit the scope of the invention. It should be understood that the invention may be implemented by other methods within the scope of the invention that satisfies requirements of a configuration requirement of the present invention.

An e-mail processing system according to the present invention may be used in a sever that detects malware such as spyware, a virus or the like.

What is claimed is:

1. An e-mail processing apparatus capable of processing a spam mail, the e-mail processing apparatus comprising:
   a first outline extractor that extracts outline information showing a feature in appearance of a received e-mail wherein the first outline extractor extracts appearance information that excludes a body of an e-mail, a sender and a sender's e-mail address, and a receiver and a receiver's e-mail address, as the outline information;
   a requestor that requests outside to transmit spam detection information for detecting a spam mail based on the outline information;
   a receiver that receives the spam detection information from outside in response to a transmission of the outline information from the e-mail processing apparatus to the outside;
   a first memory unit that stores the received spam detection information; and
   a first processing unit, comprising software or hardware, that determines the e-mail is a spam mail when content of the e-mail applies to corresponding spam detection information;
   wherein the spam detection information includes both a detection rule for extracting data from the spam mail and also extraction data extracted from the spam mail using the detection rule, both the detection rule and the extraction data associated with the outline information;
   wherein the first processing unit determines whether or not determination data extracted from the received e-mail based on the detection rule matches or is approximate to corresponding extraction data included in the spam detection information;
   wherein the first processing unit extracts the determination data based on the detection rule;
   wherein when the e-mail is determined not to be spam mail by first processing unit, the requestor requests updated spam detection information by transmitting the outline information outside;
   wherein the outline information comprises at least one of: a number of lines of the e-mail, an attachment file, a format of the e-mail, and/or information on a language of the e-mail;
   wherein the detection rule comprises a rule for extracting the extraction data that comprises at least one of: a URL, a character string in a specified area, an e-mail address, an arrangement of HTML elements, an attachment file, a result of sorting in the body, sampling, and/or a character string based on a rule for detecting a spam mail; and wherein the extraction data comprises at least one of: a URL, a character string in a specified area, an e-mail address, an arrangement of HTML elements, an attachment file, a result of sorting in the body, sampling, and/or a character string based on a rule for detecting a spam mail.

2. The e-mail processing apparatus according to claim 1, further comprising:
a second memory unit that retains a plurality of sets of outline information and spam detection information that corresponds to the outline information.

3. The e-mail processing apparatus according to claim 2, further comprising:
a synchronizer that synchronizes content of the memory unit with an external database;
wherein the synchronizer transmits to the external database the outline information retained in the memory unit and the spam detection information that corresponds to the outline information, and causes the memory unit to retain the difference of the spam detection information received through the receiver.

4. The e-mail processing apparatus according to claim 2, further comprising:
a synchronizer that synchronizes content of the memory unit with an external database;
wherein the synchronizer transmits the outline information retained in the memory unit to the external database, receives identification information of the spam detection information that corresponds to the outline information through the receiver, and requests the external database to transmit spam detection information of the difference that is not retained in the memory unit, based on the received identification information.

* * * * *